United States Patent
Winn et al.

(10) Patent No.: US 10,515,416 B2
(45) Date of Patent: Dec. 24, 2019

(54) SYSTEM AND METHODS FOR HOSTING MISSIONS WITH UNMANNED AERIAL VEHICLES

(71) Applicant: Infatics, Inc., San Francisco, CA (US)

(72) Inventors: Michael Winn, San Francisco, CA (US); Jonathan James Millin, San Francisco, CA (US)

(73) Assignee: Infatics, Inc., San Francisco, CA (US)

( * ) Notice: Subject to any disclaimer, the term of this patent is extended or adjusted under 35 U.S.C. 154(b) by 1012 days.

(21) Appl. No.: 14/844,859

(22) Filed: Sep. 3, 2015

(65) Prior Publication Data

US 2017/0083979 A1   Mar. 23, 2017

Related U.S. Application Data

(60) Provisional application No. 62/045,473, filed on Sep. 3, 2014.

(51) Int. Cl.

| | |
|---|---|
| *G06Q 40/08* | (2012.01) |
| *H04W 4/021* | (2018.01) |
| *H04Q 9/02* | (2006.01) |
| *B64C 39/02* | (2006.01) |
| *G06Q 20/10* | (2012.01) |
| *G06Q 30/06* | (2012.01) |
| *G08G 5/00* | (2006.01) |
| *H04L 29/08* | (2006.01) |

(52) U.S. Cl.
CPC .......... *G06Q 40/08* (2013.01); *B64C 39/024* (2013.01); *G06Q 20/102* (2013.01); *G06Q 30/0645* (2013.01); *G08G 5/0034* (2013.01); *H04L 67/32* (2013.01); *H04Q 9/02* (2013.01); *H04W 4/021* (2013.01); *B64C 2201/123* (2013.01); *B64C 2201/146* (2013.01)

(58) Field of Classification Search
CPC ... G08G 5/0069; B64C 39/024; G05D 1/0094
USPC .......................................................... 705/4
See application file for complete search history.

(56) References Cited

U.S. PATENT DOCUMENTS

| | | | |
|---|---|---|---|
| 6,151,539 A | 11/2000 | Bergholz et al. | |
| 8,280,633 B1 * | 10/2012 | Eldering | G06Q 40/08 702/3 |
| 8,626,361 B2 * | 1/2014 | Gerlock | G08G 5/0013 340/991 |

(Continued)

FOREIGN PATENT DOCUMENTS

WO   WO-2013014646 A1 *   1/2013   ........... G05D 1/0022

OTHER PUBLICATIONS

Goddemeier et al. Coverage Evaluation of Wireless Networks for Unmanned Aerial Systems. IEEE Globecom 2010 Workshop on Wireless Networking for Unmanned Aerial Vehicles. (2010).*

*Primary Examiner* — Virpi H Kanervo
(74) *Attorney, Agent, or Firm* — Jeffrey Schox; Diana Lin

(57) ABSTRACT

A system for managing UAVs includes a first relay that performs mission management on a first UAV; a first conduit, corresponding to a first geographical area, that manages communication between the first UAV and first relay when the first UAV is located in the first geographical area; a first web server that enables user interfacing with the first UAV; and a pre-flight insurance tap that generates an insurance quote for a mission of the first UAV when an instance of the pre-flight insurance tap is called by the first relay.

20 Claims, 5 Drawing Sheets

(56) References Cited

U.S. PATENT DOCUMENTS

| | | |
|---|---|---|
| 9,266,611 B2 | 2/2016 | Rambo |
| 9,346,543 B2 | 5/2016 | Kugelmass |
| 9,346,544 B2 | 5/2016 | Kugelmass |
| 2002/0120474 A1* | 8/2002 | Hele ................ G06Q 10/10 705/4 |
| 2004/0139470 A1* | 7/2004 | Treharne ............ G08G 1/017 725/105 |
| 2010/0004802 A1 | 1/2010 | Bodin et al. |
| 2012/0314068 A1 | 12/2012 | Schultz |
| 2013/0052994 A1* | 2/2013 | Hayward ........ H04L 41/0813 455/411 |
| 2015/0120878 A1 | 4/2015 | Horgan et al. |
| 2015/0319769 A1* | 11/2015 | Grabowsky ..... H04W 72/1236 455/510 |
| 2016/0150142 A1 | 5/2016 | Lapstun et al. |

\* cited by examiner

SYSTEM AND METHODS FOR HOSTING MISSIONS WITH UNMANNED AERIAL VEHICLES

CROSS-REFERENCE TO RELATED APPLICATIONS

This application claims the benefit of U.S. Provisional Application No. 62/045,473, filed on 3 Sep. 2014, which is incorporated in its entirety by this reference.

TECHNICAL FIELD

This invention relates generally to the field of unmanned aerial vehicles and more specifically to a new and useful system and methods for hosting missions with unmanned aerial vehicles.

DESCRIPTION OF THE EMBODIMENTS

The following description of the embodiments of the invention is not intended to limit the invention to these embodiments, but rather to enable any person skilled in the art to make and use this invention.

1. System

Figure 1:
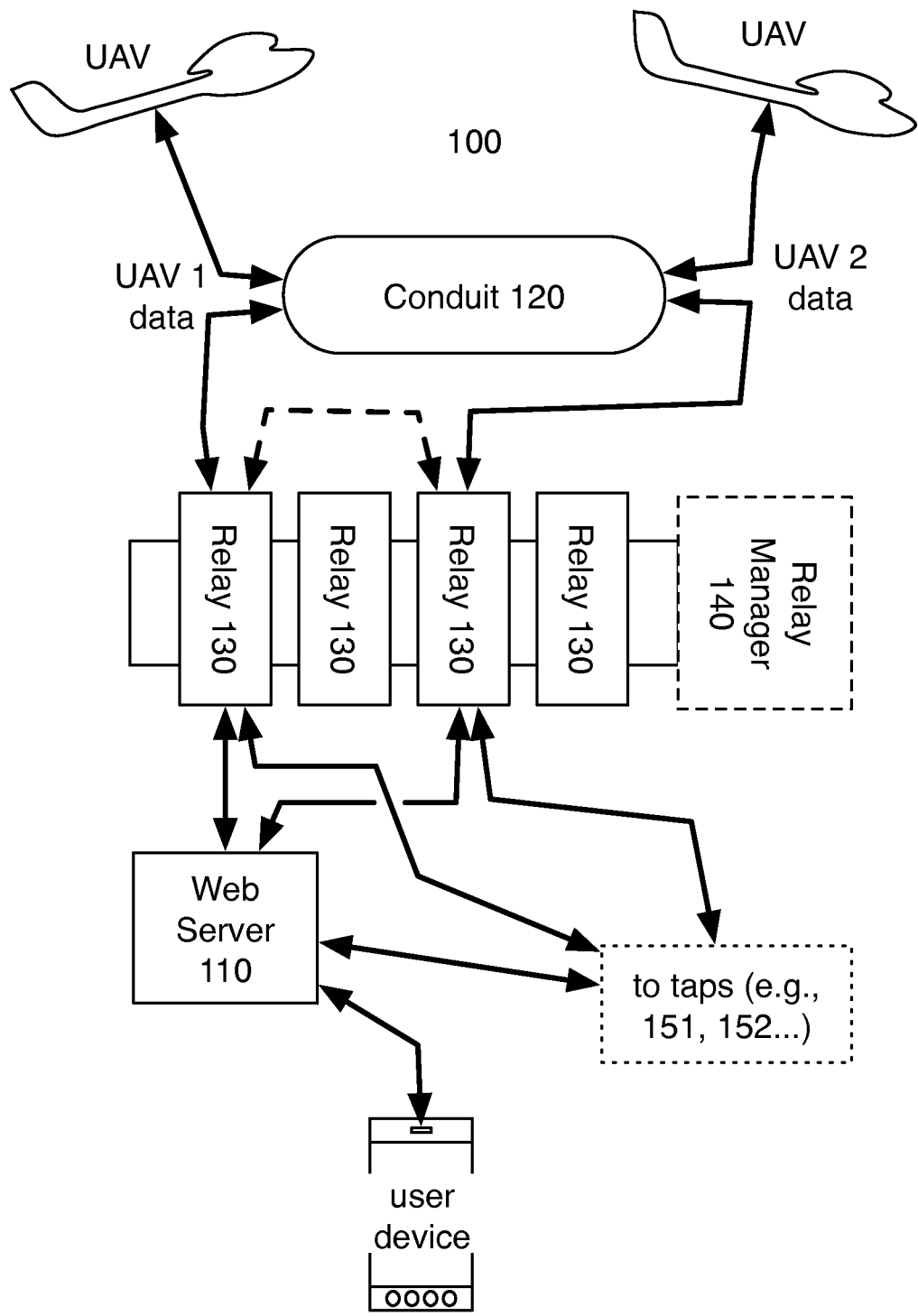
FIG. 1 is a schematic representation of a system in accordance with the invention.
Figure 2:
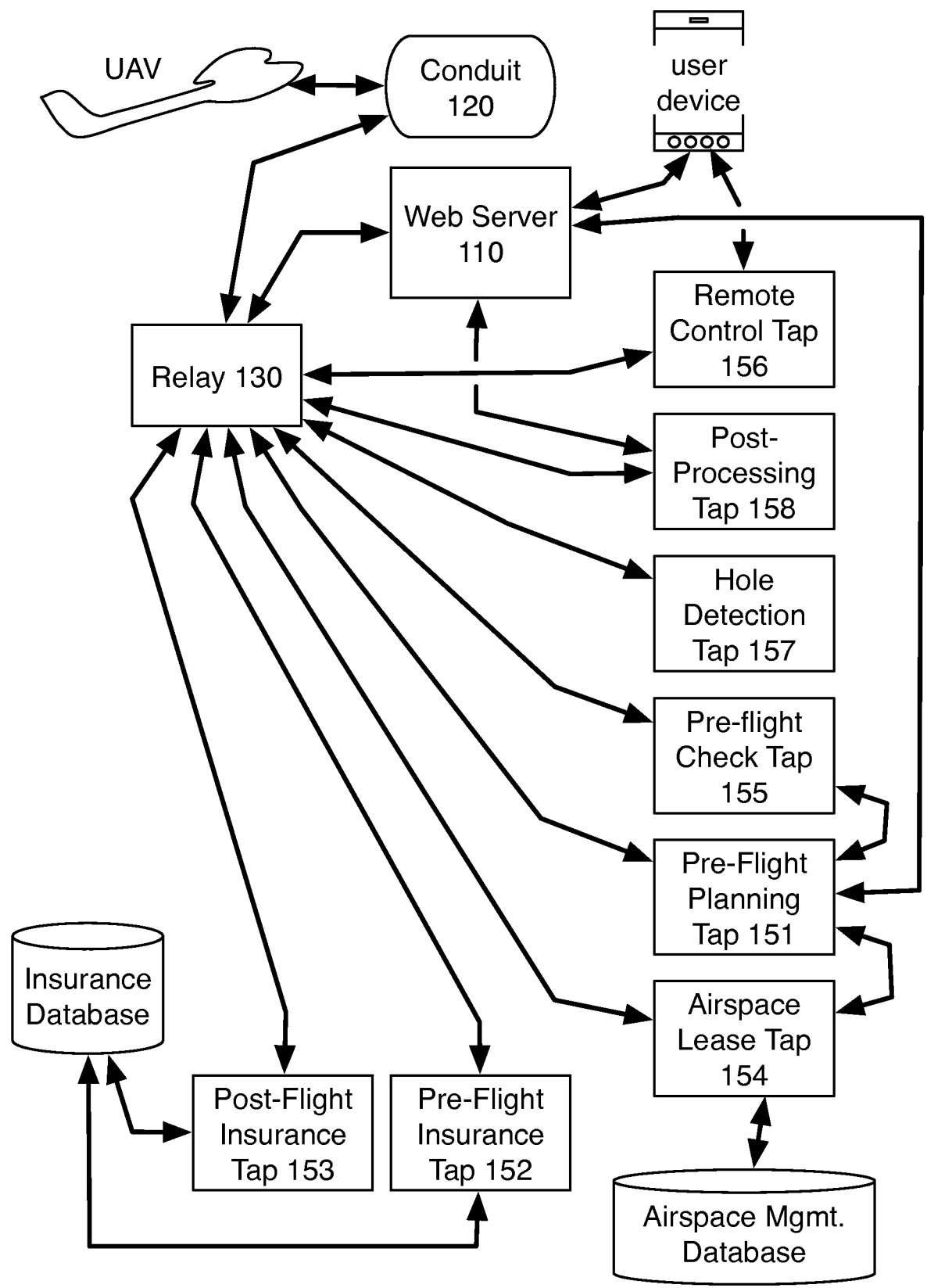
FIG. 2 is a schematic representation of one variation of the system.

As shown in FIGS. 1 and 2, a system 100 for hosting missions with unmanned aerial vehicles (UAVs) includes: a web server 110 (which may correspond to a region) hosting an instance of a user interface receiving a set of mission parameters and a geospatial location for a mission from a user within the region; a conduit 120 corresponding to a second region coincident the geospatial location; a set of relays 130, a particular relay 130 in the set of relays 130 transiently assigned to the mission, generating a flight path for a UAV assigned to the mission, transmitting telemetry data corresponding to the flight path to the UAV through the conduit 120, and receiving sensor data collected by the UAV during execution of the mission by the UAV through the conduit 120; and a set of taps, the particular relay 130 queuing an instance of a particular tap in the set of taps, the instance of the particular tap executing a function on behalf of the mission based on data received from the particular relay 130. The system may additionally include a relay manager 140 supporting a varying number of relays 130.

The system 100 serves as a platform for communication and management of unmanned aerial vehicles, preferably enabling real-time communication between the UAVs and the cloud for unparalleled access to UAV control and collected data.

2. Applications

Generally, the system functions to host multiple concurrent (e.g., parallel) and asynchronous (e.g., nonparallel) missions flown by multiple distinct UAVs over time. In particular, the system includes one more conduits 120, a relay manager 140 supporting a varying number of relays 130, and one or more web servers no. Each conduit 120 is affiliated with a particular geospatial region (i.e., a real ground area) and supports communications between UAVs within the corresponding region (e.g., before, during, and/or after flying the mission) and relays 130 assigned to the UAVs. The system can thus include multiple conduits 120, each assigned to and arranged within a corresponding geospatial region to enable the system to support communications with UAVs across multiple geospatial regions substantially simultaneously and over time. Similarly, each web server 110 is preferably affiliated with a particular geospatial region and supports communications between users within the region and relays 130 assigned to UAVs designated for missions submitted by the users within the region over time. The system can thus include multiple web servers no, each assigned to and arranged within a corresponding geospatial region to support communications with users (e.g., through corresponding computing devices) across multiple geospatial regions substantially simultaneously.

The relay manager 140 preferably assigns a relay 130 to each new mission and resets the relay 130 when the corresponding mission is complete. Additionally or alternatively, relays 130 may be assigned to missions in any manner. Once assigned to a mission, a particular relay 130 links a web server 110 within a region coincident the user (i.e., the user's computing device or virtual machine) to a conduit 120 within a region coincident a UAV elected for the mission, which may be in the same of different region as the user. The particular relay 130 can thus generate (or queue a related tap to generate) a flight path and telemetry data for each mission based on data received from the user through the web server 110; the particular relay 130 can communicate with the UAV through the conduit 120 to control the UAV in real-time while the UAV flies the mission and then post-process (or queue a related tap to post-process) data collected by the UAV during the mission.

The system further supports multiple taps, each of which may be affiliated with distinct functions related to UAV-based missions. For example, the system can host a pre-flight planning tap 151, a pre-flight insurance tap 152, a post-flight insurance tap 153, a pre-flight airspace lease tap 154, a pre-flight UAV systems check tap 155, an in-flight remote control tap 156, an in-flight data hole detection tap 157, and/or a data post-processing tap 158. A relay 130 assigned to a particular mission can thus selectively queue an instance of one or more available taps before, during, and/or after the mission is completed to selectively perform various functions related to the mission. For example, a relay 130 can internally execute all essential functions necessary to plan a mission, to control a UAV to perform the mission, and to collect data recorded by the UAV while flying the mission, and the relay 130 can queue an instance for each of one or more available taps to perform additional, non-essential tasks or functions related to the mission, such as binding an insurance policy for the mission before the mission is flown or generating an orthorectified geospatially-accurate visual map—from images recorded by the UAV—once the mission is complete.

The system can also dynamically redistribute resources or automatically contract additional resources to support varying regional and total processing and data storage demands as missions are queued, hosted, and completed over time. For example, the system can establish new conduits 120 corresponding to smaller geospatial regions as numbers of missions local to these conduits 120 increase. The system can similarly establish new web servers no corresponding to smaller geospatial regions as numbers of UAV missions submitted by computing device (and virtual machines) local to these web servers no increases. The system can also add new relays 130 to the relay manager 140 to enable greater numbers of missions to be generated, flown, and processed concurrently. For example, the system can dynamically and preemptively deploy additional relays 130 within the relay manager 140 based on projected future system loads.

The system can therefore serve as a multi-tenant communication platform in which various users—such as through a laptop computer, a desktop computer, tablet, a smartphone, or any other computing device—can initiate and manage UAV-based missions to collect data over ground areas of interest and/or within airspace volumes and access various micro-services (i.e., taps) supported by the platform before, during, and/or after each mission.

Each conduit 120 and web server no within the platform can run on one or more machines, virtual machines, containers, or other computing environments inside a distributed computing infrastructure, such as physically located within one or more corresponding geospatial regions. The relay manager 140 can similarly execute on one or more machines, virtual machines, containers, or other computing environments within a distributed computing infrastructure in communication with each conduit 120 and web server no within the platform.

Figure 3:
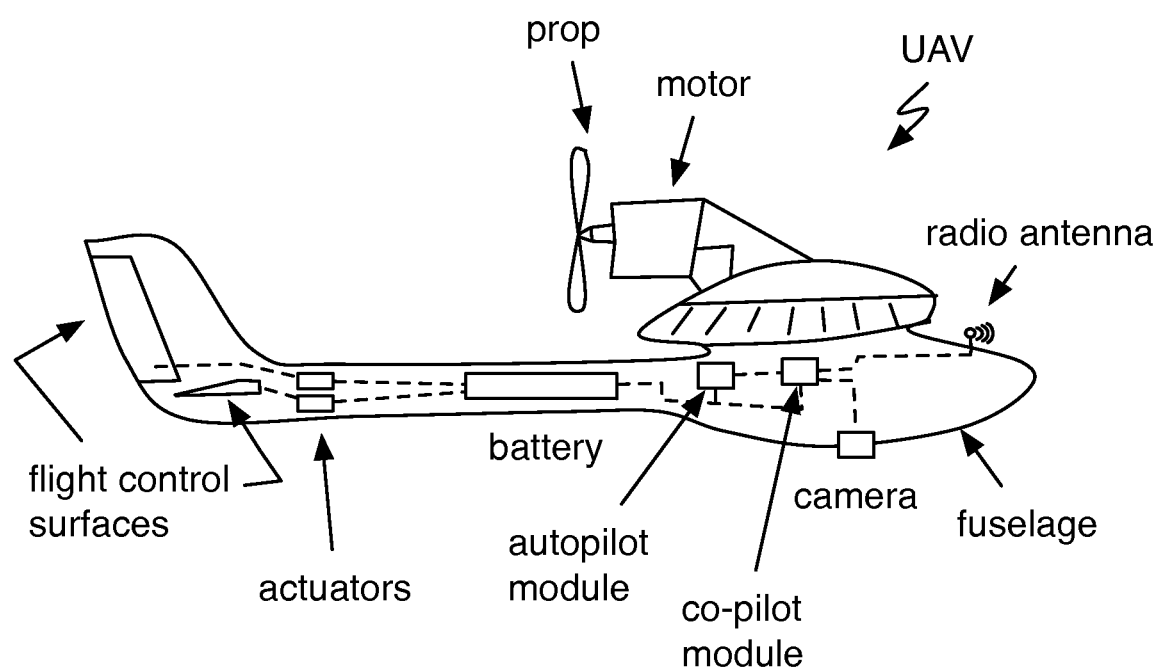
FIG. 3 is a schematic representation of an unmanned aerial vehicle in accordance with one variation of the system.

The system can therefore support and manage missions performed by multiple UAVs concurrently and over time, such as missions to collect images (e.g., digital photographic color images) of ground areas, images of ground structures and installations, uni-dimensional sensor data (e.g., humidity values), etc. and to stitch these data into two- or three-dimensional photorealistic maps, heat maps, or point clouds, etc. The system can communicate with and control one or more types of UAVs (or other unmanned vehicles), such a UAV including: flight control surfaces; actuators configured to manipulate the flight control surfaces; a motor; a prop; an autopilot module configured to control the actuators and the propulsion assembly according to a scheduled flightpath; a co-pilot module providing an interface between a remote computer network and the autopilot module, actuators within the UAV, and sensors within the UAV; and a fuselage supporting the flight control surfaces, the actuators, the autopilot module, the propulsion assembly, and the co-pilot module, as shown in FIG. 3. The UAV can also include various sensors, such as an optical sensor (e.g., a camera), a temperature sensor, a barometric sensor, etc., that capture data during missions executed by the UAV, and the co-pilot module can interface with a wireless communication module within the UAV to upload data from these sensors (and actuator data) to corresponding relays 130 via local conduits 120.

3. Web Server

As described above, the system includes at least one web server no corresponding to a region and hosting an instance of a user interface receiving a set of mission parameters and a geospatial location for a mission from a user within the region. While a web server 110 preferably corresponds to a single region, a web server 110 may additionally or alternatively correspond to multiple regions. Generally, the (or each) web server 110 functions to support a user interface accessible by a user—such as through a web browser or through a native application executing on a mobile computing device—to order a new UAV-based mission for management by the system, to access data collected by an assigned UAV substantially in real-time during execution of the mission by the UAV, to elect various taps, to retrieve processed data (e.g., a geospatial visual map) upon completion of the mission, and/or to remit payment for one or most such services. The web server no may enable user interfacing with the system 100 in any manner; for example, by providing an application programming interface (API) for use with third-party applications.

Figure 4:
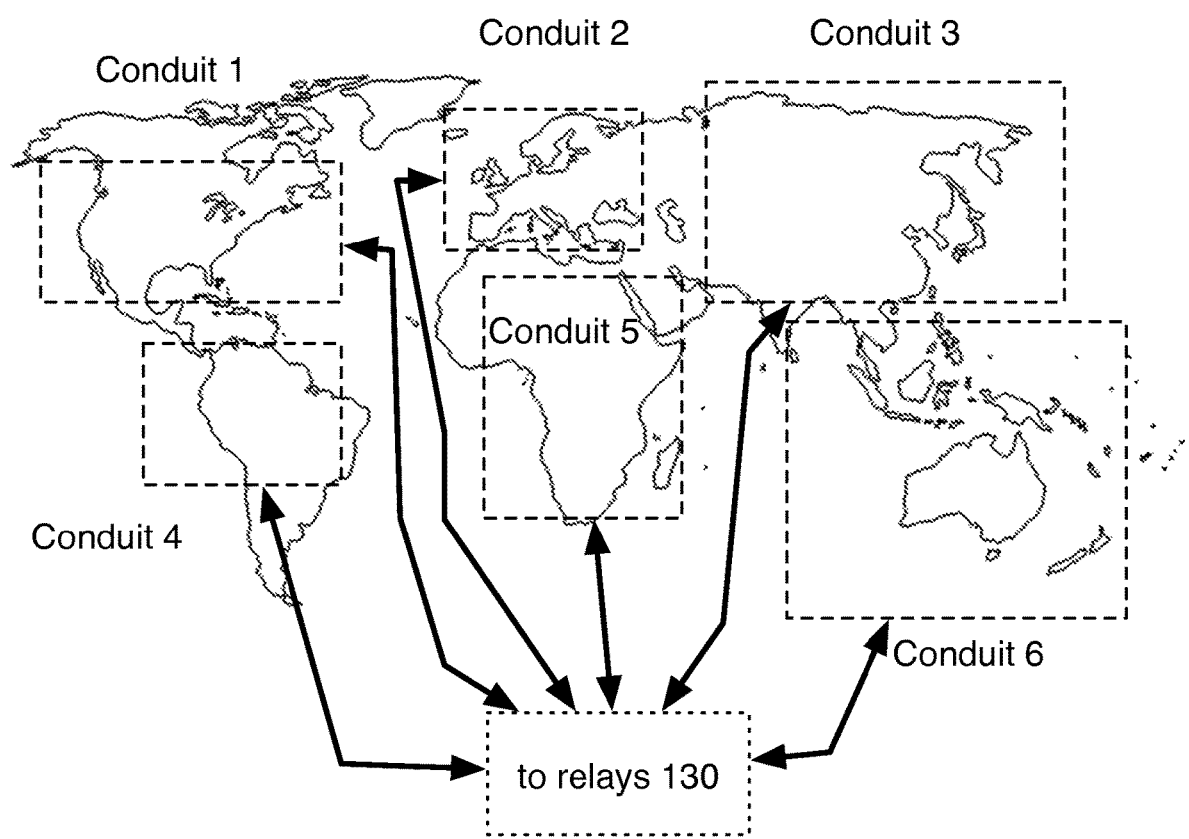
FIG. 4 is a schematic representation of one variation of the system.

As described above, a web server 110 can be assigned to and/or located within a limited geospatial (i.e., physical) region and thus handle communications between the relay manager 140 (or relays 130 individually) and computing devices accessed by various users within the region to order missions and review mission data, such as shown in FIG. 4. For example, the system can include a first web server 110 located within a first region of a country (e.g., the western region of the United States) and routing communications between a first group of customer computing devices within the first region of the country and corresponding relays 130 assigned to missions ordered through the first group of customer computing device. In this example, the system can also include a second web server no located within a second region of the country (e.g., the eastern region of the United States) and routing communications between a second group of customer computing devices within the second region of the country and corresponding relays 130 assigned to missions ordered through the second group of customer computing devices. As in this example, the first and second web servers 110 can support communications between relays 130 and customer computing devices within adjacent but distinct (i.e., non-overlapping) regions, or the first and second web servers 110 can support communications between relays 130 and customer computing devices within adjacent and overlapping regions. For example, the first and second web servers 110 can support communications, respectively, within first and second regions that each define approximately 2000-mile-wide land areas with coextensive borders that overlap by roughly 200 miles.

Each web server no can include or interface with an application server hosting a native application executing on a user's mobile computing device (e.g., smartphone) and can generate a new mission order in response to receipt of a new mission request entered by the user into the mobile computing device. In this implementation, the web server no can collect various data, such as flight parameters, geospatial coordinates (e.g., GPS coordinates) of vertices of a ground area of interest, user preferences, mission requirements, data processing parameters, etc., for the mission through the native application, and the web server 110 can package these data into an order for a new mission; the relay manager 140 can then assign an available relay 130 to the new mission and pass the order for the new mission into the assigned relay 130. The web server no can similarly generate a new mission order based on mission data supplied by a user through a web browser, such as accessible through a smartphone, a tablet, a laptop computer, or a desktop computer.

The web server no also presents mission-related data to the user—such as through the native application executing on a mobile computing device or through a web browser—such as substantially in real-time. For example, the relay 130 assigned to the mission ordered by the user can pass telemetry data (e.g., GPS location and attitude of the UAV) and/or sensor data (e.g., thumbnail images captured by a camera within the UAV) to the web server no, and the web server no can distribute these data to the user's mobile computing device for presentation to the user through the native application to enable the user to track progress of his mission substantially in real-time. The web server 110 can thus implement a transcoding media service to translate between media mediums for the user's computing device and the relay 130 assigned to the mission ordered by the user.

The web server no can also present post-mission data to the user through the native application, through a web browser, etc. For example, the relay 130 assigned to the mission can post-process data collected by the UAV assigned to the mission or call one or more taps to process data collected by the UAV during the mission and then pass the processed data to the web server 110, and the web server 110 can distribute these data to the user's computing device for review, such as following completion of the mission.

The relay 130 assigned to the mission can collect data output from a tap directly and then pass these data to the web server 110 such that the data is not distributed directly from a tap to the web server 110. Alternatively, the web server 110 can interface directly with a tap to retrieve pre-flight, in-flight, or post-flight data directly, and the relay 130 can manage (e.g., open and close) communication channels between the web server 110 and various taps elected for the mission.

The web server no can include or interface with a database containing account information for each of various users (e.g., customers) within the corresponding region. For example, the web server no can store and/or access an account for each user, UAV, UAV fleet, and/or UAV fleet manager, etc. within the corresponding region to retrieve information relevant to the entity, such as payment information, preferences, or mission order history.

4. Conduit 120

As described above, the system includes at least one conduit 120 corresponding to a geospatial region in which UAV missions are supported by the system. Generally, the (or each) conduit 120 functions to enable one- or two-way communications between a UAV (e.g., just before, during, and just after a mission) and a relay 130 assigned to the UAV for the mission flown within a region assigned to the conduit 120. Like the web server no, a conduit 120 can be assigned and/or located within a limited geospatial (i.e., physical) region and can thus handle communications between the relay manager 140 and UAVs flying missions within the assigned region. For example, the system can include a first conduit 120 located within a first region of a country (e.g., the western region of the United States) and routing communications between a first group of UAVs flying missions concurrently within the first region of the country and relays 130 assigned to the corresponding missions. In this example, the system can also include a second conduit 120 located within a second region of the country and routing communications between a second group of UAVs flying missions concurrently within the second region of the country and relays 130 assigned to the corresponding missions. As in this example, the first and second conduits 120 can support communications between relays 130 and UAVs flying missions within adjacent but distinct (i.e., non-overlapping) regions, or the first and second conduits 120 can support communications between relays 130 and UAVs flying missions within adjacent and overlapping regions. For example, the first and second conduits 120 can support communications, respectively, within first and second regions that each define approximately 2000-mile-wide land areas with coextensive borders that overlap by roughly 200 miles. However, a conduit 120 can be assigned or affiliated with all or a portion of a continent, a country, a region, a state, a city, a town, or any other suitable geographic area or location.

A conduit 120 can therefore funnel communications received from various UAVs flying missions within a region assigned to the conduit 120 to a single access point and then distribute these data to particular relays 130 assigned to the UAVs from which these data were received. The conduit 120 similarly routes data received from various relays 130 executing concurrently to the appropriate UAVs flying corresponding missions within the region assigned to the conduit 120. The conduit 120 can support multiple channels that support one- or two-way communications between a UAV just before, during, and/or just after flying a mission and a relay 130 assigned to the UAV. For example, a conduit 120 can support multiple communication instances including a first channel in which telemetry data is transmitted from a relay 130 to a corresponding UAV and a second channel in which telemetry and media data are transmitted from the UAV to the corresponding relay 130.

The conduit 120 can also dynamically adjust a rate of data transmission on each of the first and second channels in a communication instance, such as substantially in real-time during a mission flown by a UAV to compensate for variations in bandwidth available to the communication instance or to compensate for a density of data necessarily uploaded to the UAV to preserve the integrity of the UAC and/or the mission. For example, a minimum rate of data transmission from a relay 130 to a corresponding UAV may be required during a mission to substantially ensure that sufficient telemetry data is uploaded to the UAV to preserve control of the UAV throughout the mission. However, a maximum data transfer bandwidth available to the UAV may be diminish as additional concurrent missions flown by other UAVs within the region assigned to the conduit 120 come on line and/or as a distance between the UAV and a nearby cellular tower—to which data is uploaded from the UAV—increases. The conduit 120 can therefore dynamically throttle a portion of the total bandwidth allocated for receiving media data (e.g., digital photographic images) from the UAV to maintain at least the minimum bandwidth necessary to upload telemetry data from the corresponding relay 130 to the UAV. In this example, the conduit 120 can thus distribute a command to the UAV substantially in real-time to reduce (or increase) a rate at which data is offloaded from the UAV, to increase (or reduce) a degree to which data (e.g., media, images, sensor data) is compressed locally on the UAV before transmission to the assigned relay 130 via the conduit 120, and/or to prioritize transmission of image metadata (e.g., time, altitude, GPS location, and attitude of the UAV at the time an image was captured) over actual photographic images and/or other sensor data. The conduit 120 can therefore deliver a command to a UAV, such as in real-time during a flight, to throttle a data upload rate to substantially ensure that flight parameters and flight controls (e.g., telemetry data) necessary to fly the UAV and to complete the mission reach the UAV promptly. In particular, the conduit 120 can dynamically adjust data communications with the UAV to prioritize transmission of telemetry data to the UAV since sensor data (e.g., image data) can be downloaded from the UAV asynchronously, such as upon completion of the mission.

The conduit 120 may adjust communications with UAVs in any manner and for any purpose. For example, the conduit 120 may change encryption used for communication between the conduit 120 and UAVs in response to a change in the sensitivity of data transmitted to or from the conduit 120. As a second example, the conduit 120 may adjust the amount or frequency of communication based on battery life and/or range of UAVs from the conduit 120.

5. Relays

As described above, the system includes a relay manager 140 incorporating a number of relays, the relay manager 140 transiently assigning an available relay 130 (i.e., a relay 130 not currently assigned to another mission) to each new mission as new mission are entered into and received through one or more web interfaces within the system. The relay manager 140 and the set of relays 130 can execute on an application server or other suitable computer system or computer network, and a relay 130—assigned to a particular UAV for a particular mission—thus executes remotely from the assigned UAV and a user requesting the mission.

The relay manager 140 temporarily assigns a relay 130 to a mission, such as: when mission parameters (e.g., a flight path, sensor data recordation parameters, etc.) are generated before a mission; during, just before, and just after a UAV assigned to the mission flies the flight path; and upon completion of the mission when data collected by the UAV is post-processed. Assignment of a particular relay 130 to a particular UAV for a particular mission can persist through each of the planning, in-flight, and post-processing stages of the particular mission. Alternatively, different relays 130 can be assigned to the particular UAV for each stage of the corresponding mission.

As described above, a relay 130 assigned to a particular UAV for a particular mission can internally execute various essential functions necessary to plan the mission, to control the UAV to perform the mission, and to collect data recorded by the UAV while flying the mission. For example, a relay 130 can manage in-flight functions of the assigned UAV in real-time, including modifying an existing flight path or generating a new flight path for the UAV in real-time during execution of the mission based on real (e.g., GPS location, attitude) data received from the UAV through the conduit 120 and/or based on collected external data, such as real weather data corresponding to a geospatial location occupied by the UAV during the mission.

A relay 130 can further queue an instance of one or more available taps to perform additional tasks or functions for the mission, such as before the mission is flown, while the mission is flown, or upon completion of the mission. For example, a relay 130 can queue an instance of a pre-flight insurance tap 152 to bind an insurance policy for the UAV and/or for the mission. In another example, a relay 130 can queue a map post-processing tap 158 to generate an orthorectified geospatially-accurate visual map from images recorded by the UAV during the mission. A relay 130 can also manage pre-flight functions for the UAV specific to the mission by collecting mission data through the web server 110 and then generating a flight path for the UAV, such as by calling an instance of a pre-flight planning tap 151, passing these user-entered data into the pre-flight planning tap 151, and collecting the resulting flight path from the instance of the pre-flight planning tap 151 before terminating the instance of the pre-flight planning tap 151. A relay 130 can thus record elections for one or more taps entered by a user—with mission-related data—through a web server no and queue instances of these taps as necessary.

The relay manager 140 can also predict resource load for available types of taps and can preemptively, dynamically, and in real-time allocate resources to queue basic or preferred in-flight taps to preserve real-time controls for various missions currently in operation and hosted by various corresponding relays 130 within the system.

For example, the relay manager 140 may delay post-processing tap execution if executing post-processing operations may result in negative consequences to operating missions.

A relay 130 can also function to collect user input data (e.g., mission requirements or preferences) entered through a web server no local to a user and to send data to and receive data from the UAV through a conduit 120 local to the UAV. For example, a relay 130 assigned to a UAV for a mission can control, support, manipulate, and/or mediate communications between a corresponding user (e.g., customer) through a local web server 110 (e.g., in a first region of the world) (e.g., a "first endpoint") and the UAV through a local conduit 120 (e.g., in a second region of the world distinct from the first region) (e.g., a "second endpoint"). In this example, a relay 130 can be dedicated to the assigned UAV for the corresponding mission, such as to minimize latency in communications between the user and the UAV (or between the conduit 120 and the web server 110) and to preserve control and data processing architectures for the mission until the mission is complete. In one implementation in which the relay 130 calls a remote control tap 156 for remotely controlling the UAV in real-time during the mission, as described below, the relay 130 can also support communications between a third-party user through the same or different local web server 110 (e.g., a "third endpoint") and the UAV to enable the UAV to be controlled manually and remotely by the third-party entity.

The relay manager 140 can therefore assign or "check out" a particular available relay 130 for a particular UAV assigned to or selected for a particular mission. For missions requiring multiple UAVs (flying separate flight paths), a first relay 130 assigned to a first UAV for the mission can communicate with a second relay 130 assigned to a second UAV for the mission, such as directly or through an instance of a cross-relay 130 tap called by both the first and second relays 130. In this implementation, the first and second relays 130 can thus cooperate to dynamically adjust flight paths for each corresponding UAV in real-time to complete the mission.

The relay manager 140 can host a preset, limited number of relays 130. The system can further create or contract for additional relays 130 as needed to support demand for requested UAV missions. For example, the system can automatically and dynamically scale or redistribute resources to achieve a target number of supported relays to meet a target percentage (e.g., 92%, 106%) of demand for UAV missions hosted concurrently on the system.

6. Taps

The system supports a set of taps, each executable to perform a function—on behalf of a mission and/or a UAV—based on data received from a corresponding relay 130 and/or web server 110. In particular, a relay 130 assigned to a particular UAV for a particular mission can queue an instance of a particular tap in the set of taps for the particular mission, and the instance of the particular tap can execute a function on behalf of the mission based on data received from the particular relay 130, such as data collected from an affiliated user through a local web server no before or after the mission or such as sensor data collected from a UAV assigned to the particular mission through a local conduit 120 during execution of the mission.

The system supports multiple taps, wherein an instance of each tap performs a particular pre-flight, in-flight, or post-flight function or service for a mission once called by a relay 130. A relay 130 assigned to a particular UAV for a particular mission thus queues an instance of each user-elected or automatically-selected tap for the particular mission. For example, in response to receipt of a request to output a geospatial map of data collected by a UAV during a mission, such as from a user through a local web server 110, the corresponding relay 130 can queue an instance of a post-flight post-processing tap 158 to assemble images downloaded from the UAV (via a local conduit 120) into a visual geospatial map; the relay 130 can then deliver the visual geospatial map from the post-processing tap 158 to the user via the local web server 110. In another example, a relay 130 can automatically queue an instance of a pre-flight insurance tap 152 to provide insurance quotes to a user and to bind insurance policy coverage(s) for the mission substantially in real-time once receipt of mission parameters are collected from the user through the web server 110; in this example, the relay 130 can automatically pass parameters of the corresponding mission into the instance of the pre-flight insurance tap 152 to drive automatic generation of an insurance policy for the mission, as described below.

Taps supported within the system can be either free or require payment for execution for a particular mission. For example, the system can support a first set of free taps executing basic functions, such as a pre-flight planning tap 151 that generates flight paths and flight parameters for UAVs, a pre-flight insurance tap 152 that quotes and binds insurance policies for missions substantially in real-time, an airspace lease tap 154 that interfaces with a government agency to lease a volume of airspace for missions, and a two-dimensional image processing tap that generates two-dimensional geospatial visual maps based on data collected by UAVs during missions. In this example, the system can also support a second set of paid taps executing higher-level functions, such as an in-flight remote control tap 156 enabling third-party entities to take manual control of UAVs during missions, an in-flight hole detection tap 157 that detects areas or volumes of missing sensor data over ground areas or real volumes of interest during missions, and a three-dimensional image processing tap that generates three-dimensional geospatial visual maps based on data collected by UAVs during missions.

The system can host taps and instances of taps internally. Additionally or alternatively, a relay 130 assigned to a UAV for a mission can call an instance of an external tap, such as a tap developed and hosted by a third-party developer. The system can therefore also include an API or SDK to support development of additional taps by external tap developers, and the system can host or otherwise interface with these additional taps to provide additional pre-flight, in-flight, and/or post-flight functionality to missions.

The system can further contract for additional resources and/or redistribute existing resources to accommodate increased demand for concurrent instances of various taps supported within the system.

6.1 Planning Tap

In one implementation, the system supports a pre-flight planning tap 151 executable by a relay 130 to generate a flight path and other flight parameters for a corresponding UAV during an assigned mission. Generally, once a new mission is requested by a user through a local web server 110 and a relay 130 and a UAV are thus assigned to the new mission, the relay 130 can call an instance of the pre-flight planning tap 151 and pass mission-related data received from the user (through the web server 110) into the pre-flight planning tap 151 to generate a (target) flight path and other (target) flight parameters for the UAV to execute during the mission.

In one example implementation, a web server no serves a user interface to a user through a native application or a web browser executing on the user's computing device (e.g., smartphone, laptop computer, etc.) and collects various mission parameters from the user, such as a selection for a type of output for the mission (e.g., an orthorectified geospatially-accurate visual map), a ground area of interest, geospatial waypoints within or around the ground area of interest, a type of sensor data to be collected by a UAV during the mission (e.g., photographic images, temperature data, chemical sensor data, etc.), resolution requirements for the mission output (e.g., a number of pixels within the map per real ground distance), etc. The web server 110 then triggers the relay manager 140 to assign an available relay 130 to the new mission and passes these data into the elected relay iso; the relay 130 then passes selections of these data into an instance of the pre-flight planning tap 151, which generates a flight path and flight parameters for a UAV substantially ensure achievement of the type of mission output, the resolution requirement, etc. selected by the user. The web server 110 can also receive a selection for a particular UAV to fly the mission (e.g., a UAV owned by the user), and the relay 130 can access a database of UAV data, retrieve data specific to the particular UAV (e.g., an assigned address, flight history data, current sensor configuration, etc.) from the database, and pass relevant UAV data into the pre-flight planning tap 151; the pre-flight planning tap 151 can thus implement these UAV-specific data to tailor the flight path to the particular UAV and/or to check that the UAV is capable of achieving the mission requirements entered by the user (e.g., to check that a camera of sufficient imaging capabilities is installed in the UAV).

In one example, the pre-flight planning tap 151 can also set a maximum cruising altitude for the UAV for image capture periods during the mission, such as based on capabilities of a camera installed in the UAV and as recorded in the database of UAV data to substantially ensure that images captured by the UAV during the mission are of sufficient number and quality to generate an orthorectified geospatially-accurate visual map at a desired resolution (e.g., five pixels per real ground foot, one pixel per real ground foot) elected by the user. In this example, the pre-flight planning tap 151 can also access a topography map for the selected ground area of interest that exhibits varying topography and the set a target altitude for the UAV over discrete geographic locations within the ground area of interest based on the topography of the ground area recorded in the topography map. In this example, the web server 110 can further prompt the user to elect a desired geospatial accuracy for the map (e.g., accurate to within twenty feet, ten feet, or one foot), and the pre-flight planning tap 151 can select a number of waypoints (e.g., one waypoint for a twenty-foot accuracy selection, five waypoints for a one-foot accuracy selection) and/or an image step-over value (e.g., 10% for a twenty-foot accuracy selection, 50% for a one-foot accuracy selection) for the UAV flight path to substantially ensure that the accuracy selection can be met with data collected by the UAV during the mission. The pre-flight planning tap 151 can further select a target ground speed (or target air speed) for the UAV based on capabilities or flight characteristics of the UAV and can set an image capture rate for the UAV during an image capture stage of the mission based on the target ground speed (or the target air speed) and the image step-over value selected for the mission. The pre-flight planning tap 151 can thus generate a target flight path (e.g., a boustrophedonic flight path) over all or a portion of the user-selected ground area of interest, the target flight path executable by the UAV to capture a sufficient number of images of sufficient quality and spacing to enable generation of an orthorectified geospatially-accurate visual map that meets the user's requirements.

In a similar example, the web server 110 can route a selection for a two- or three-dimensional geospatially-accurate point cloud or heat map from the user interface to the relay 130 assigned to the mission, such as for a temperature point cloud, a chemical incidence (e.g., "parts-per-million") point cloud, a humidity point cloud, etc. for uni-dimensional data collected from one or more sensors installed in the UAV; the web server no can also collect a selection for a real volume in space in which to collect data for the point cloud and a selection for a resolution of the point cloud (e.g., a maximum distance between adjacent data points in the cloud) and then route these selections to the corresponding relay 130. The relay 130 can pass this data output selection and resolution selection to the pre-flight planning tap 151 to instruct generation of the flight path and flight parameters for the mission. In this example, the pre-flight planning tap 151 can set lateral, longitudinal, and vertical distances between sensor readings recorded by the UAV to achieve the resolution requirement entered by the user. In particular, the pre-flight planning tap 151 can calculate vertical step-over distances (or "altitude steps") for the flight path to substantially ensure that a point cloud generated from data collected by the UAV during the mission achieves a data density (or resolution) requirement—set by the user—along its vertical axis. The pre-flight planning tap 151 can similarly calculate a lateral step-over (i.e., a distance between adjacent long segments of a boustrophedonic flight path) to support collection of sufficient data to generate the point cloud that achieves a lateral data density requirement (e.g., along a horizontal Y-axis) elected by the user. Furthermore, the pre-flight planning tap 151 can also set an air or ground speed for the UAV and a sampling rate of the sensor—based on the selected air or ground speed of the UAV—to support collection of sufficient data to generate the point cloud that achieves a longitudinal data density requirement (e.g., along a horizontal X-axis) elected by the user.

The relay 130 can also select a take-off site and a landing site for the UAV or receive a preferred take-off site and a preferred landing site for the mission from the user, and the relay 130 can thus pass these parameters to the corresponding instance of the pre-flight planning tap 151; the pre-flight planning tap 151 can thus generate initial and final segments of the flight path for the UAV to fulfill the selected or preferred take-off and landing sites. Alternatively, the pre-flight planning tap 151 can cross reference a database of take-off and landing sites within the ground area of interest selected for the mission, select the take-off and landing sites for the UAV for the mission, and generate leading and tail ends of the flight path for these selected take-off and landing sites accordingly.

An instance of the pre-flight planning tap 151 can thus output—to the corresponding relay 130 that called the instance—a flight path and flight parameters for the UAV for the mission, such as a flight path and flight parameters assembled into a mission file for the UAV. The relay 130 can then upload all or a portion of the mission file to the UAV (via the conduit 120) before the flight begins. The relay 130 can then execute various methods or techniques internally to modify the flight path and/or flight parameters for the UAV in real-time as UAV telemetry data and/or sensor data is collected from the UAV during the mission, such as to modify the flight path as necessary to achieve map resolution requirements specified by the user. The relay 130 can similarly recall an instance of the pre-flight planning tap 151 or call an instance of a similar in-flight planning tap to modify the flight path or to generate a new flight path for the remainder of the mission as the mission is in process. For example, the relay 130 can call an instance of an image processing/hole detection tap 157, as described below, in real-time as the UAV executes the mission.

6.2 Airspace Lease Tap

In another implementation, the system supports an airspace lease tap 154 executable by a relay 130 to acquire—on behalf of the UAV—a lease for a volume of airspace in which the UAV is scheduled to fly during the mission. Generally, once a relay 130 generates a flight path for the mission internally or receives a mission file including a flight path from an instance of a pre-flight planning tap 151 called by the relay 130, the relay 130 can call an instance of the airspace lease tap 154 and pass parameters from the planned flight path for the UAV into the instance of the airspace lease tap 154 to lease (or "check out") a corresponding volume of airspace for the UAV for the flight.

In one example implementation, the relay 130 passes the full planned flight path for the UAV for the mission into an instance of the airspace lease tap 154. In one example, the airspace lease tap 154 calculates a minimum real volume in space necessary to fully contain the UAV from the beginning of the flight path through the end of the flight path accounting for both for the size (e.g., wingspan) of the UAV and some tolerance in the actual position of the UAV during the mission, such as a tolerance of 100 feet from each target point on the planned flight path for a UAV with a five-foot wingspan. In this example, the airspace lease tap 154 can calculate a safety volume (e.g., a sphere of 100-foot radius) for the UAV, such as based on a size of the UAV, a target ground or air speed for the UAV, common or predicted wind conditions at the target altitude(s) specified for the UAV in the flight path, etc., and the airspace lease tap 154 can sweep this safety volume along the planned flight path for the UAV for the mission to calculate the minimum real volume in space necessary to fully contain the UAV during the mission. In another example, the airspace lease tap 154 similarly calculates a minimum real geometric volume in space—such as a cube, a rectangle, a cylinder, etc.—necessary to fully contain the UAV throughout the mission. In this example, the airspace lease tap 154 can calculate a safety volume for the UAV for the mission, sweep the safety volume along the planned flight path for the UAV for the mission, and calculate a minimum spatial volume of a standard geometry (e.g., a cube) that fully contains (or "bounds") the swept volume. In either of these examples, the volume calculated (either the safety volume or the minimum real volume to contain the UAV) may be referred to as the contained volume. In yet another example, the airspace lease tap 154 accesses a database of predefined leasable airspace volumes (e.g., approximately-cubic volumes of two-mile widths stacked in space upward from sea level), such as a governmental airspace management database, and the airspace lease tap 154 identifies one or more (contiguous) predefined leasable airspace volumes coincident the planned flight path for the UAV for the mission and/or that intersect(s) the swept volume defined by the safety volume and the planned flight path for the UAV for the mission. In the foregoing examples, the UAV can thus pass the determined minimum real volume in space necessary to fully contain the UAV during the mission, the minimum spatial volume of standard geometry necessary to bound the planned flight, or the identifiers for select predefined leasable airspace volumes into the governmental airspace management database to request lease of the real airspace volume for the UAV for the mission.

The airspace lease tap 154 can also pass a preferred or scheduled date and time for execution of the mission and a projected duration of the mission (with an extra period of time (e.g., one hour) on each side of the projected duration of the mission) to the airspace management database. For example, an instance of the airspace lease tap 154 can retrieve timing parameters for the mission from the corresponding relay 130, such as a preferred date, a preferred time of day, a preferred day of week, etc. to start and end mission and/or a latest date to complete the mission, such as collected from the user via a local web server 110; the instance of the airspace lease tap 154 can then access a calendar database of airspace volume leases—stored in the airspace management database—to identify a next time during which the volume of real airspace is available and meets the user's timing requirements. If the requested airspace is available for the preferred or scheduled date and time of the mission, the airspace lease tap 154 can confirm the mission for the UAV with the airspace management database and pass this confirmation back to the relay 130 to initiate a next step in planning and/or executing the mission. The airspace lease tap 154 can further trigger the relay 130 to deliver a payment information request to the user through the local web server 110, the web server 110 can pass payment information (e.g., entered by the user or retrieved from user account) back to the relay 130, the relay 130 can pass this payment information to the instance of the airspace lease tap 154, and the instance of the airspace lease tap 154 can purchase a lease for the requested airspace for the requested time and date—on behalf of the user—by passing this payment information to the airspace management database.

However, in the foregoing example implementation, if the requested airspace volume is not available at a time that meets the time requirements entered by the user, the airspace lease tap 154 can—automatically or with cooperation of the user—request an alternative date and time for tenancy within the requested airspace volume. For example, an instance of the airspace lease tap 154 can prompt the user—via an interface hosted by the web server 110—to change the timing requirements and/or the ground area of interest to be imaged and repeat this process until airspace volume and mission timing parameters for the mission align with the calendar database of airspace volume leases stored in the airspace management database.

Additionally or alternatively, the airspace lease tap 154 can receive, from the airspace management database, information identifying a portion of the requested airspace volume that conflicts (i.e., intersects) with another pending airspace lease for the requested time and date. The airspace lease tap 154 can call directly or trigger the relay 130 to call an instance of the pre-flight planning tap 151 to adjust the flight path to resolve the conflict; the airspace lease tap 154 can then calculate a new airspace volume for the mission and pass this new airspace volume to the airspace management database to finalize a lease for the new airspace volume for the UAV for mission.

The airspace lease tap 154 may additionally or alternatively submit a request for a change in the other pending (conflicting) airspace to the airspace management system.

The airspace lease tap 154 can thus interface with an external entity (e.g., the airspace management system) to charter a volume of airspace for the UAV for the mission; can interface with the user via the web server 110, such as directly or through the relay 130, to collect payment information for the lease from the user; and/or can directly or indirectly trigger an instance of the pre-flight planning tap 151 to (re)calculate a flight path for the UAV for the mission.

In one variation, the airspace lease tap 154 applies a time dimension to the requested airspace volume lease for the mission. For example, the airspace lease tap 154 can specify a safety volume (e.g., a sphere of 50 m spherical radius, a cylinder loom in diameter and 250 m long) for the UAV, as described above, and generate a time-dependent location volume model for the UAV for the mission by applying the safety volume to the flight path according to a projected speed(s) of the UAV during the mission. The airspace lease tap 154 can thus define a probable location of the UAV at various instances in time between takeoff and landing of the UAV during the mission, and the airspace lease tap 154 can interface with the airspace management database to confirm the mission if no other planned flight within the area (also characterized by a corresponding time-dependent location volume model) is scheduled to intersect the time-dependent location volume model of the UAV in space at a particular moment in time during the mission. The airspace lease tap 154 can thus lease time-dependent volumes of airspace for UAVs for corresponding missions.

Partitioning of volumes according to time is preferably done according to set time windows (e.g., volumes are calculated for each ten minutes of flight time), but additionally or alternatively, partitioning of volumes according to time is preferably accomplished dynamically. For example, the airspace lease tap 154 may make more partitions (i.e., smaller volumes/smaller time intervals) in areas where conflicts are more likely (e.g., busy airspace) and may make fewer partitions (i.e., larger volumes/larger time intervals) in areas where conflicts are less likely.

6.3 Pre-Flight Insurance Tap

One implementation of the system supports a pre-flight insurance tap 152 executable by a relay 130 to quote and bind one or more insurance policies for the UAV and/or for the mission. Generally, a relay 130 can call an instance of the pre-flight insurance tap 152 to automatically generate a quote for one or more insurance policies for the planned mission based on planned flight parameters and to automatically bind the policy(ies) once confirmed by the user.

In one example implementation, the relay 130 passes flight plan data into an instance of the pre-flight insurance tap 152, and the instance of the pre-flight insurance tap 152 cooperates with the web server 110 to collect policy limit data for the upcoming mission from the user—such as through a native application executing on the user's mobile computing device or through a web browser accessed by the user through a laptop computer—for a liability insurance policy and/or for a physical damage insurance policy. For example, the pre-flight insurance tap 152 can trigger delivery of a prompt to the user to enter limits for a liability policy as required in a contract to be flown by the UAV for the mission. Alternatively, the pre-flight insurance tap 152 can trigger delivery of a prompt to the user to supply contact information for a second party holding the contract with the user to image (or otherwise collect data over) the ground area of interest, and the pre-flight insurance tap 152 can automatically communicate with second party to retrieve liability limit requirements elected by the second party.

In another example, the pre-flight insurance tap 152 can trigger delivery of a prompt to the user to enter or select a limit for physical damage to the UAV during the mission. In this example, the pre-flight insurance tap 152 can recall limits entered previously by the user for the same UAV, for similar UAVs in the user's fleet, or for similar missions; the pre-flight insurance tap 152 can additionally or alternatively retrieve limits entered by other users for similar UAVs and/or for similar missions; and the pre-flight insurance tap 152 can then present these data to the user through the user interface.

In yet another example, the pre-flight insurance tap 152 can trigger delivery of a prompt to the user to enter or select a limit for an airport premises liability policy for the mission. The pre-flight insurance tap 152 can further trigger delivery of a prompt to the user—through the web server 110—to select a deductible for the liability insurance policy, for the physical damage policy, and/or for the airport premises liability policy if elected by the user for the mission.

Once the pre-flight insurance tap 152 thus records which of a liability policy, a physical damage policy, an airport premises policy, and/or any other relevant insurance policy and the corresponding limits and deductibles elected for the mission by the user, the pre-flight insurance tap 152 can assess a risk for each elected policy for the mission and calculate a corresponding premium (i.e., a cost for the policy) accordingly.

The pre-flight insurance tap 152 may additionally or alternatively trigger delivery of a prompt to a user that requests the user to agree to conditions of the insurance policy. For example, a user may be prompted to agree to not assume manual control of the UAV (or automatically forfeit the policy).

In one example, the pre-flight insurance tap 152 automatically calculates a premium for the liability policy by assessing risk to property within the ground area of interest selected for the mission. In this example, the pre-flight insurance tap 152 can access a database of types, sizes, and locations of buildings, outcroppings, crops, telephone and power lines, livestock, etc. within and around the selected ground area of interest and estimate a cost of damage to the property if the UAV were to crash within (or around) the ground area of interest, such as based on stored actuarial models. The pre-flight insurance tap 152 can also assess a risk posed by the UAV to people within (and around) the ground area of interest, such as by calculating a likelihood that the UAV will impact a human within (or around) the ground area of interest in the event of a crash landing based on a known population density in the ground area of interest retrieved from a population density database. The pre-flight insurance tap 152 can also access flight history data and/or claim history data specific to the UAV, to UAVs of the same type or configuration, and/or to missions previously flown over portions of the ground area of interest to predict a risk that the UAV will crash during the mission, to calculate a risk and a cost associated with this risk accordingly, and to thus determine a premium for the liability policy for the UAV for the mission.

In another example, the pre-flight insurance tap 152 automatically calculates a premium for the physical damage policy by assessing risk to the UAV during execution of the mission. In this example, the pre-flight insurance tap 152 can assess a risk of hull damage or total loss of the UAV during scheduled takeoff and landing procedures within the mission, such as by accessing a database of location-specific terrain types, slopes, obstacles, etc. and estimating risk of partial or total loss to UAV during the takeoff and landing procedures based on a particular terrain type, slope, and/or obstacles, etc. within the take-off and landing area(s) specified in the flight path for the mission. The pre-flight insurance tap 152 can also assess a risk to the UAV while in flight throughout the mission, such as based on: a number of hours on the UAV hull and internal UAV components; a flight history of the UAV and/or other UAVs over the ground area of interest; actual or forecast local weather conditions and a size or weather capability of the UAV; a topography over the ground area of interest, known ground-based obstacles, and a target altitude for the UAV during the mission; a characteristic of the ground area over which the UAV will fly during the mission (e.g., if over water or a gorge, a loss would be a total loss; if over an agricultural field, a loss may be partial with at least some components recoverable); etc.

The pre-flight insurance tap 152 can thus correlate the risk to the UAV during the mission with a premium for the physical damage policy based on a known or projected cost to replace the hull of the UAV and/or various components installed in the UAV in the event of loss (e.g., a crash) and the limits and deductible elected for the physical damage policy.

The pre-flight insurance tap 152 may compare risk to the UAV during a mission to preset risk thresholds. For example, if the weather changes suddenly mid-mission, the pre-flight insurance tap 152 may detect that the mission is substantially riskier than previously believed (i.e., that some risk exceeds a set risk threshold). In this instance, the pre-flight insurance tap 152 may present a prompt to the user requesting intervention (e.g., "land the UAV or risk forfeiting the insurance policy", "land the UAV or accept this more expensive insurance policy") or may even communicate directly with the relay 130 or a flight controlling tap to automatically cause the UAV to land. The pre-flight insurance tap 152 may perform any request or action in response to mid-mission changes in risk.

The pre-flight insurance tap 152 can then interface with the web server no directly or indirectly (e.g., through the relay 130) to present one or more policies to the user for confirmation. For example, the pre-flight insurance tap 152 can trigger the web server no to serve to the user a discrete liability policy and a discrete physical damage policy for the UAV for the mission, each with a corresponding premium, deductible, limits, and terms. Alternatively, the pre-flight insurance tap 152 can merge the liability and physical damage policies into a single policy. The pre-flight insurance tap 152 can also present various policies with different liability limits and deductibles—and therefore different premiums—to the user. The pre-flight insurance tap 152 can then prompt the user—through the web server 110—to elect one or more such polices for the UAV for the mission and to enter payment information for the elected policy(ies). Once one or more policies are elected by the user and payment information is thus received, the pre-flight insurance tap 152 can automatically bind the policy(ies) for the mission, such as substantially in real-time.

The pre-flight insurance tap 152 can implement similar methods and techniques to combine policies for multiple UAVs—cooperatively flying a single mission—into a single group policy for the mission, to present the single group policy to the user, and to bind the group policy for the mission in response to election of and payment for the group policy by the user.

6.4 Post-Flight Insurance Tap

One implementation of the system supports a post-flight insurance tap 153 executable by a relay 130 to receive and handle insurance claims for the UAV and for the mission. Generally, a relay 130 can call an instance of the post-flight insurance tap 153 to automatically detect a possible claimable insurance event from UAV telemetry data collected through a local conduit 120, to preemptively trigger a local web server 110 to serve a user interface for entry of an insurance claim to a user's computing device, to receive insurance claim information from the user, to determine a viability of the insurance claim by automatically referencing UAV data (e.g., telemetry data, in-flight controls data, etc.) from the mission against one or more insurance polices held for UAV and/or for the mission, to automatically process payment to the user in response to identification of a viable claim, and/or to trigger manual claim processing by an insurance representative.

In one implementation, a relay 130 queues an instance of the post-flight insurance tap 153 in response to receipt of an insurance claim for the UAV and/or for the mission, and the instance of the post-flight insurance tap 153 can automatically access flight data for the UAV to determine if elements of the claim are accurate, such as to determine if the claimed accident actually occurred or is likely to have occurred based on accelerometer and/or gyroscope data recorded during the mission by onboard sensors within the UAV. The post-flight insurance tap 153 can also analyze data collected by the UAV during the mission—such as telemetry, GPS, temperature, acceleration, gyroscope, and/or other data recorded by the UAV during the mission and uploaded to a database within the system via a local conduit 120—to determine a cause of the incident. The post-flight insurance tap 153 can further compare this determined cause to an insurance policy effective for the UAV and/or for the mission to determine if the cause of the incident is covered by the policy. For example, the post-flight insurance tap 153 can correlate a severe acceleration event recorded by an accelerometer within the UAV with impact with a structure, cross-reference a GPS location and altitude of the UAV at the time of the sever acceleration event with a geospatial map of structures of known height to identify a structure with which the UAV collided, and then determine if damage to the structure is cover by an effective liability policy held for the mission and if damage to the UAV due to collision with the structure is covered by an effective physical damage policy held for the UAV. In this example, the post-flight insurance tap 153 can determine if the location of the UAV at the time of impact coincides with a ground area in which one of more insurance policies if effective for he mission or if the UAV flew outside of a zone of coverage for the one or more policies. If the UAV flew outside of the coverage zone, the post-flight insurance tap 153 can analyze telemetry and/or flight path data for the UAV—such as generated by a corresponding relay 130 or an instance of a flight planning tap during execution of the mission by the UAV—to determine if the flight path generated by the system for the UAV violated rules governing insurance coverage for the mission (e.g., in which case the loss may be covered by a representative of the system) or if the flight path was proper and a component of the UAV malfunctioned in a mode covered by an effective liability policy or an effective physical damage policy bound for the mission (e.g., in which case all or a portion of the loss may be covered by the insurance policy).

In a similar example, the post-flight insurance tap 153 accesses flight history data for the mission to determine if the UAV was under automated or manual control at the time of the incident (e.g., if an instance of a remote control tap 156 was queued around the time of the incident) and analyzes available UAV data around the time of incident to determine if the incident was due to pilot error if the UAV was under manual control at the time of the incident. If applicable, the post-flight insurance tap 153 then determines if an insurance policy effective at the time of incident covers manual operation of the UAV and selectively authorizes payout for the loss accordingly.

In another example, the post-flight insurance tap 153 analyzes data collected by one or more sensors within the UAV and/or data generated by a corresponding relay 130 before and/or during execution of the mission up to the time of the incident to determine if local weather conditions resulted in failure of one or more systems in the UAV, such as based on local weather condition data retrieved from a remote weather database. If the post-flight insurance tap 153 determines that weather conditions may have led to the incident, the post-flight insurance tap 153 can then predict if the flight should have been automatically cancelled by the system, by the user, or by a UAV operator (e.g., the user or an other individual) due to pending weather conditions leading up to the time of the incident. The post-flight insurance tap 153 can thus automatically determine if the incident is covered by one or more insurance policies effective for the mission.

Therefore, as in the foregoing examples, the post-flight insurance tap 153 can automatically analyze available data from the mission to estimate or identify a party at fault for the claimed incident or to predict a failed component of the UAV that led to the incident, and the post-flight insurance tap 153 can handle compensation for the incident accordingly. For example, the post-flight insurance tap 153 can retrieve UAV system data as described in U.S. Provisional Application No. 62/000,933, filed on 20 May 2014, which is incorporated in its entirety by this reference.

The post-flight insurance tap 153 can also automatically execute the foregoing methods and techniques to estimate the occurrence of a loss during execution of the mission. In various examples, a relay 130 can automatically call an instance of the post-flight insurance tap 153 to analyze available UAV data for a possible insured loss in response to receipt of a severe acceleration event transmitted from the UAV during the mission and exceeding a preset threshold acceleration value (e.g., indicating that the UAV collided with a structure, such as a building or a tree); in response to detected partial or complete loss of communications with the UAV while in-flight; or in response to receipt of telemetry data received from the UAV during the flight indicating that the UAV was loosing altitude and approaching ground level before loss of communications with the UAV.

Alternatively, the post-flight insurance tap 153 can automatically collect and package UAV and mission data in response to receipt of an insurance claim from the user and then automatically pass this package to an insurance representative for processing. The post-flight insurance tap 153 can also enable a user to upload images taken of the incident and package these images with the UAV and mission data. The post-flight insurance tap 153 can further add UAV, mission, local weather, image, and/or insurance claim data to an insurance database to teach future risk assessment and cost models for future missions, such as in response to receipt of a claim for the mission.

Figure 5:
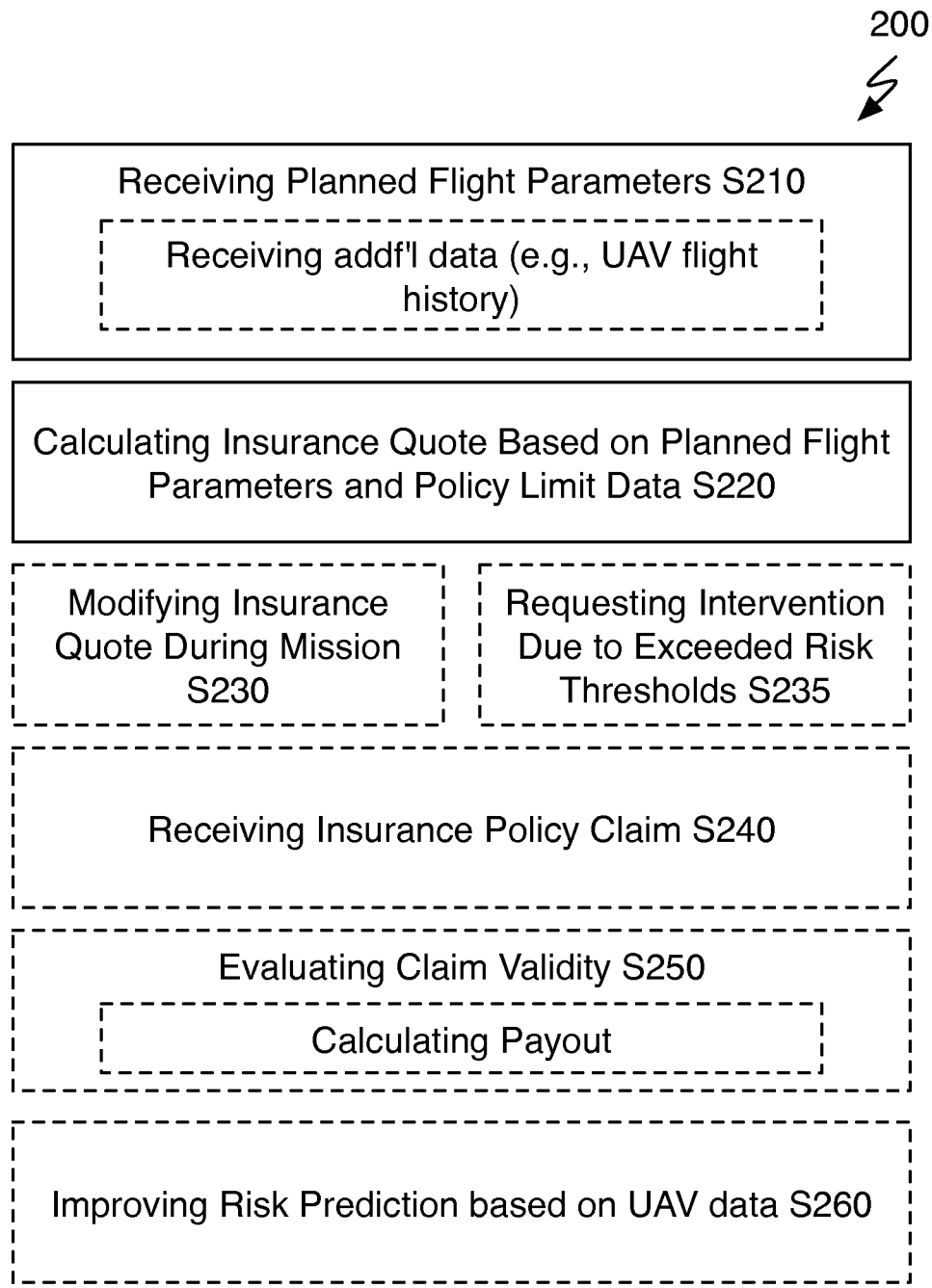
FIG. 5 is a chart representation of a method.

The pre-flight and post-flight insurance taps may be used according to an insurance method 200, as shown in FIG. 5. Note that the method 200 may include any of the steps described in the sections describing the pre-flight and post-flight insurance taps (as well as additional information relevant to said steps described in other parts of the present application) and is not limited to the implementation as shown in FIG. 5.

6.5 Pre-Flight Check Tap

One implementation of the system supports a pre-flight check tap 155 executable by a relay 130 to test various systems and subsystems installed in the UAV. Generally, a relay 130 can call an instance of a pre-flight check tap 155—such as before or during execution of a pre-flight planning tap 151 also queued by the relay 130 or just before the UAV is scheduled to embark on the mission—to retrieve a real operational status of one or more systems or subsystems of the UAV, such as described in U.S. Provisional Application No. 62/000,933. Operational status data may include any data related to operational status of the UAV; e.g., battery life, maintenance data, performance data, etc. The pre-flight check tap 155 can therefore interface with the pre-flight planning tap 151 to generate a flight path and flight parameters for the mission that are customized for the capabilities and operational status of the UAV selected for the mission. The pre-flight check tap 155 can also prompt the user (or a UAV operator) to select an alternative UAV for the mission or to exchange one or more components installed in the UAV before flying the mission based on a discrepancy between mission output requirements and the status or current capabilities of the UAV.

6.6 Remote Control Tap

One implementation of the system supports a remote control tap 156 executable by a relay 130 to enable real-time remote control of the UAV while the UAV is in flight during the mission. Generally, a relay 130 can queue an instance of the remote control tap 156 to enable the user or an other human user to take some level of manual control of the UAV during execution of the mission.

As described above, a flight path generated for the UAV for the mission can define a default landing path and default landing parameters for landing the UAV, and the relay 130 can track the UAV and update the default landing path when necessary during execution of the mission by pushing new flight parameters and/or new or adjusted segments of the flight path to the UAV via the conduit 120. The relay 130 can also monitor data collected by the UAV upon landing approach to preempt landing failure. For example, the relay 130 can implement machine techniques to analyze images captured by the UAV over the designated landing area (e.g., before or during the landing procedure) to identify potential obstacles to landing the UAV and can call an instance of the remote control tap 156 to postpone landing pending additional human input if an obstacle or other obstruction to landing the UAV is detected. In particular, if the UAV, the relay 130, or an automated landing tap called by the relay 130 cannot determine a suitable path or parameter for landing the UAV, such as within a threshold degree of confidence, the relay 130 can automatically call an instance of the remote control tap 156. In particular, the remote control tap 156 can enable a human to take remote control of the UAV and to execute a remote, manually-controlled landing procedure for the UAV. In this example, the relay 130 can monitor telemetry data received from the UAV as the UAV initiates a landing procedure at the end of a mission, calculate a risk of damage to the UAV in completing the scheduled and planned landing procedure (or calculate a confidence in a successful landing), and queue an instance of the remote control tap 156 for the mission if the calculated risk in the landing procedure exceeds a threshold risk (or if the confidence in a successful landing falls below a threshold confidence level). The relay 130 can thus switch UAV control into a manual mode, and the user or a second human user can access some level of manual control of the UAV through a local web server 110. The remote control tap 156 can collect UAV control inputs entered by the user or the second user through the local web server 110, and the relay 130 can translate these inputs (as applicable) and pass a form of these inputs to the UAV via the local conduit 120. The relay 130 can also pass images (e.g., thumbnail images) and select UAV data (e.g., altitude, attitude, wind speed, battery state of charge, compass bearing, etc.) received from the UAV via the local conduit 120 into the remote control tap 156 to provide real-time UAV data to the user or to the second user as the user or the second user provides inputs to land the UAV manually. Once the UAV is successfully landed in manual mode, the relay 130 can terminate the instance of the remote control tap 156.

In another example implementation, the remote control tap 156 enables a human user (e.g., the user, the second user) to access images of a landing zone elected for the UAV and prompts the human user to select a particular area within the landing zone to land the UAV, to select an approach direction, and/or to identify obstacles within the landing area from images received from the UAV. In this example implementation, the relay 130 can pass images of the landing area collected by the UAV—either in real-time or asynchronously—into the remote control tap 156, and the remote control tap 156 can cooperate with a web server 110 local to the human user to provide these images to the human user. The human user can then access these images and enter any of the foregoing inputs to provide additional guidance to the relay 130 and/or or the UAV, etc. to complete the automated landing procedure and thus complete the mission.

A relay 130 can therefore automatically call an instance of the remote control tap 156 for a UAV to enable an owner, operator, fleet manager, or other human user affiliated with the UAV, the mission, or the system to supply landing commands or additional landing-related information for UAV and the corresponding mission. A relay 130 can additionally or alternatively call an instance of the remote control tap 156 to prompt a human representative of a third-party to land the UAV or to provide additional information to enable the relay 130 to automatically land the UAV. For example, the remote control tap 156 can interface with a crowd-sourcing platform to enable individuals unaffiliated with the UAV or the system to perform flight-related tasks on behalf of the UAV—such as manually landing the UAV remotely and/or providing landing-related information specific to the UAV—substantially in real-time.

6.7 Image Processing Tap: Hole Detection

One implementation of the system supports a hole detection tap 157 executable by a relay 130 to enable automated detection of real (i.e., physical) areas within the ground area of interest or real volumes in a real volume of interest in which sufficient data was not collected by the UAV during the mission. Generally, a relay 130 can call an instance of the hole detection tap 157 to detect missing sensor data in real-time during the mission or asynchronously upon completion of the mission and to update a current flight path or generate a new flight path to enable the UAV to gather the missing data, thereby enabling the relay 130 or an instance of a post-processing tap 158 to generate a map, point cloud, or heat map, etc.—from the data collected by the UAV during the mission—that meets the user's selected data density, resolution, accuracy, and/or other requirements. The hole detection tap 157 can thus detect regions within the ground area of interest or volumes within a real volume of interest in which no sensor data was collected by the UAV, in which an insufficient density of data was collected by the UAV, and/or in which data of insufficient quality (e.g., a blurry photographic image) was captured to enable composition of a visual map, point cloud, heat map, etc. of resolution requirement, etc. requested by the user. The hole detection tap 157 can then generate an additional flight path or flight path segment(s) to be completed by the UAV to capture sensor data where sensor data was missing or to capture better sensor data where only sensor data of insufficient quality was captured.

In one example implementation, the hole detection tap 157 virtually assembles a two-dimensional visual map of the ground area of interest for the mission or a three-dimensional point cloud or heat map for a real volume of interest for the mission and tests this visual map, point cloud, or heat map against resolution, accuracy, and/or other post-processing requirements specified by the user for the mission to determine if data is missing or insufficient to meet the user's requirements. In one example in which the UAV captures photographic images of the ground area of interest, the hole detection tap 157 stitches full-size or thumbnail images captured by the UAV into a virtual two-dimensional map; detects voids in the virtual map representing missing image data; detects low-data regions of images corresponding to insufficient overlap between adjacent image; detects images of insufficient quality (e.g., blurry images) within the virtual map; and identifies real locations corresponding to the voids, low-data regions, and images of insufficient quality based on geospatial positions of known features captured in the virtual map and/or based on known geospatial positions and attitudes of the UAV when each image in the virtual map was captured, etc.

In a similar example, the hole detection tap 157 projects a ground region represented in each image captured by the UAV based on a geospatial (e.g., GPS) location, altitude, and attitude (e.g., pitch, yaw, roll) of the UAV at a time in which each image was captured by the UAV. In particular, in this example, the hole detection tap 157 calculates a perimeter (e.g., an empty box) of a real area of the ground area of interest corresponding to each image captured by the UAV and substantially without access to full-size or thumbnail images captured by the UAV during the mission. The hole detection tap 157 then identifies real areas within the ground area of interest not represented in images captured by the UAV and/or real areas within the ground area represented by images of insufficient overlap to achieve the post-processing requirements elected by the user. The hole detection tap 157 can thus detect holes in image data collected by the user based on telemetry (e.g., geospatial, attitude, and altitude) data received from the UAV (e.g., image meta data) and substantially without full-size or compressed versions of the actual images captured by the UAV throughout the mission.

In one example implementation, a relay 130 calls an instance of the hole detection tap 157 during execution of the mission by a corresponding UAV to track collection of sensor data by the UAV, to identify areas or volumes of missing sensor data substantially in real time, and to automatically update a flight path for the UAV to enable the UAV to collect the missing sensor data before the UAV lands at the end of the mission. In this example implementation, the hole detection tap 157 can analyze sensor data substantially in real as sensor data is received from the UAV via the local conduit 120 to identify missing sensor data, and the hole detection tap 157 can trigger the UAV to return to areas over the ground area of interest to capture missing data substantially in real-time as areas or volumes of missing data is detected. Alternatively, the hole detection tap 157 can analyze sensor data received from the UAV upon completion of each successive stage of the mission, such as upon completion of each successive linear segment of a boustrophedon flight path executed by the UAV, and the hole detection tap 157 can trigger the UAV to return to areas over the ground area of interest to capture missing data before moving on to the next stage (e.g., linear segment) of the flight path. Yet alternatively, the relay 130 can call an instance of the hole detection tap 157 once the flight path over the ground area of interest is completed and (just) before the UAV begins its landing approach, and the hole detection tap 157 can trigger the UAV to return to areas over the ground area of interest to capture missing data before initiating the landing procedure.

Once a need to capture missing data or to recapture insufficient data over one or more regions of the ground area of interest (hereinafter "missing ground regions") is thus determined, the hole detection tap 157 can calculate an approach direction for each a missing ground region. For example, the hole detection tap 157 can calculate an eigenvector for each discrete missing ground region and assign an approach direction to each discrete missing ground region based on the corresponding eigenvector. In particular, an eigenvector for a particular discrete missing ground region can predict an approach direction for the UAV over a missing image ground area that yields a best, most efficient, and/or most effective route to fully image the missing ground region. The hole detection tap 157 can also select a target altitude for the UAV when imaging the missing ground region, such as by electing an original target altitude specified in the original flight path for the mission or by calculating a new (e.g., lower) target altitude if the original target altitude yielded insufficient data results (e.g., insufficient image resolution).

The hole detection tap 157 can then implement methods or techniques as described above to generate a flight path and corresponding flight parameters (e.g., one or more target altitudes and attitudes of the UAV, a target approach bearing, etc.) over each missing ground region to enable the UAV to fully image each missing ground region. Similarly, an instance of the hole detection tap 157 can interface with an instance of an in-flight planning tap (e.g., similar to the pre-flight planning tap 151) or with the corresponding relay 130 directly to generate distinct flight paths and flight parameters for imaging each discrete missing ground region. The hole detection tap 157 can also: enlarge each missing ground region, such as by 10%; increase a sampling rate of the camera; reduce a target ground speed of the UAV; etc. for each missing ground region to substantially ensure that the missing ground region will be imaged with sufficient image overlap and that sufficient data density will be captured over the missing ground area in a single fly-over pass.

Once a discrete flight path is generated for each missing ground region, the hole detection tap 157 (or relay 130 or in-flight planning tap) can generating linking paths between the current location of UAV, each discrete flight path for the missing ground regions, and a landing zone or a landing path specified for the mission; the hole detection tap 157 can thus aggregate these linking paths, the discrete flight paths for the missing ground regions, and the landing path into a substitute flight path for the remainder of mission. In particular, if a discrete flight path is generated for each missing ground region, the hole detection tap 157 can order the discrete missing ground region, such as based on eigenvectors for each missing ground region; based on a shortest distance between ends of flight paths for adjacent missing ground regions; to achieve a minimum flight path overlap among linking paths between flight paths for discrete missing ground regions; to achieve a minimum total absolute change in altitude between flight paths for discrete missing ground regions, based on the current location of the UAV; based on the location of the landing zone; and/or based on a specified start location of a next leg of the mission; etc. The hole detection tap 157 can thus generate a linking path between current real position of the UAV and a start location for a flight path of a missing ground region ordered first among flight paths for a set of missing ground regions. The hole detection tap 157 can then generate additional linking paths between end locations for a flight path for one missing ground region flight path and a flight path for a subsequent-ordered missing ground to assemble the substitute flight path for the UAV for the remainder of the mission.

The hole detection tap 157 (or the relay 130, etc.) can further account for altitude changes, a state of charge of a battery within the UAV, flight control limitations of the UAV (e.g., a minimum banking radius, a maximum rate of altitude change, a stall speed, a maximum speed, etc. of the UAV), and/or other mission parameters to order flight paths for missing ground regions and to generate linking paths between the discrete flight paths. For example, the hole detection tap 157 can remove less important missing ground regions from a docket of missing ground regions for (re) imaging if all missing ground regions cannot be imaged before the mission ends, such as if the UAV has insufficient battery life to image all missing ground region, if inclement weather is pending, or if a lease on the airspace assigned to the UAV will expire before the UAV can (re)image all missing ground regions.

The relay 130 can then upload all or a portion of the substitute flight path to the UAV via the conduit 120 for execution by the UAV before completion of the mission.

The hole detection tap 157 (and/or the relay 130 can implement similar methods or techniques to detect missing or insufficient uni-dimension sensor data collected by the UAV. For example, a relay 130 can call in instance of the hole detection tap 157 to assemble a point cloud or heat map from chemical, temperature, humidity, or barometric pressure, or other uni-dimensional sensor data collected with a corresponding sensor in the UAV during the mission and to then test this point cloud or heat map against a data density, maximum separation distance, and/or other parameter(s) specified by the user for post-processed mission data. The hole detection tap 157 can thus generate one or more additional flight paths executable by the UAV to collect these missing sensor data.

6.8 Post-Processing Tap: Map Generation

One implementation of the system supports a post-processing tap 158 executable by a relay 130 to stitch visual image data, uni-dimensional sensor data, and/or data collected by the UAV during the mission into a two- or three-dimensional visual map, point cloud, heat map, etc. For example, a relay 130 can call an instance of the post-processing tap 158 to stitch a series of digital photographic images collected by the UAV during the mission into an orthorectified geospatially-accurate visual map and/or into a three-dimensional geospatially-accurate point cloud.

A relay 130 can call the post-processing tap 158 during the mission to assemble sensor data into a post-processed format substantially in real-time as sensor data is received from the UAV via a local conduit 120. The relay 130 can additionally or alternatively call the post-processing tap 158 upon completion of the mission—such as during low system resource load periods—to assemble sensor data received from the UAV and stored in memory local or remote to the system into a post-processed format suitable for delivery to the user. The relay 130 can thus call the post-processing tap 158 while the UAV is flying the mission to process sensor data in real-time or after completion of the mission to process sensor data asynchronously, and the system can bill the user accordingly, such as by billing the user more for real-time processing of sensor data than for asynchronous processing of sensor data.

The post-processing tap 158 can further trigger the web server 110 to prompt the user to enter processing parameters for sensor data collected during the mission, or the post-processing tap 158 can retrieve data processing parameters directly from the relay 130 or from a planning tap called by the relay 130. For example, the post-processing tap 158 can retrieve a callout for an orthorectified geospatially-accurate visual map and a corresponding resolution requirement, geospatial accuracy requirement, and preferred or final delivery date for the map. The post-processing tap 158 can implement these parameters to generate an orthorectified geospatially-accurate visual map, and the relay 130 can deliver the map to the user via a local web server 110.

7. Other Vehicles

The system can implement similar methods and techniques to host multiple concurrent and asynchronous missions performed by multiple other unmanned vehicles over time, such as unmanned wheeled vehicle, unmanned track vehicles, unmanned watercraft, and/or unmanned spacecraft, etc.

The systems and methods of the invention can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for managing unmanned aerial vehicles (UAVs), the system comprising:
    a first relay configured to perform mission management on a first UAV, wherein performing the mission management on the first UAV comprises transmitting control data to the first UAV and receiving first UAV sensor data from the first UAV;
    a first conduit, corresponding to a first geographical area, configured to manage communications between the first UAV and the first relay when the first UAV is located in the first geographical area;
    a first web server, communicatively coupled to the first relay, configured to enable a user to interface with the first UAV; and
    a pre-flight insurance tap configured to generate an insurance quote for a first mission of the first UAV when an instance of the pre-flight insurance tap is called by the first relay, wherein:
    the pre-flight insurance tap is configured to generate the insurance quote based on planned flight parameters associated with the first mission and a calculated risk profile containing risk thresholds;
    the system presents information associated with the insurance quote to the user;

the first UAV is located within the first geographical area; and during the first mission, in response to determination of risk exceeding the risk thresholds based on sensor data comprising the first UAV sensor data, the planned flight parameters are modified to maintain the risk within the risk thresholds.

2. The system of claim 1, further comprising a second relay configured to perform mission management on a second UAV, wherein performing the mission management on the second UAV comprises transmitting control data to the second UAV and receiving second UAV sensor data from the second UAV, wherein the sensor data comprises the second UAV sensor data, wherein the first conduit manages communications between the second UAV and the second relay when the second UAV is located in the first geographical area, and wherein the first web server is communicatively coupled to the second relay.

3. The system of claim 1, wherein the pre-flight insurance tap is configured to generate the insurance quote based further on policy limit data collected from the user.

4. The system of claim 3, wherein the pre-flight insurance tap is configured to collect the policy limit data by prompting the user to enter at least one of:
a liability policy limit, a physical damage policy limit, and an airport premises liability policy limit.

5. The system of claim 4, wherein the pre-flight insurance tap is configured to:
prompt the user to agree to insurance policy conditions; and
activate a selected insurance policy after an agreement by the user.

6. The system of claim 1, wherein the pre-flight insurance tap is configured to generate the insurance quote based further on policy limit data and a UAV property risk assessment, and wherein the UAV property risk assessment is calculated by the pre-flight insurance tap using property data pertaining to an area overflown by the first UAV during the first mission.

7. The system of claim 1, wherein the pre-flight insurance tap is configured to generate the insurance quote based on planned flight parameters for the first mission, policy limit data, and a UAV damage risk assessment, and wherein the UAV damage risk assessment is calculated by the pre-flight insurance tap using topographical data pertaining to an area overflown by the first UAV during the first mission.

8. The system of claim 7, wherein the UAV damage risk assessment is calculated by the pre-flight insurance tap using both topographical data pertaining to the area overflown by the first UAV during the first mission and flight history data of the first UAV.

9. The system of claim 1, wherein the insurance quote is modified during the first mission by the pre-flight insurance tap in response to changes in mission environmental conditions.

10. The system of claim 1, wherein the insurance quote is modified during the first mission by the pre-flight insurance tap in response to deviation from the planned flight parameters.

11. The system of claim 1, wherein the pre-flight insurance tap is configured to modify the planned flight parameters to maintain the risk within the risk thresholds by directing the first UAV to abort the first mission in response to risk exceeding the risk thresholds.

12. The system of claim 1, wherein the pre-flight insurance tap is configured to prompt the user to modify the planned flight parameters of the first mission in response to risk exceeding the risk thresholds.

13. The system of claim 1, further comprising a post-flight insurance tap configured to automatically detect possible insurance events resulting from UAV telemetry data collected during the first mission.

14. The system of claim 13, wherein the post-flight insurance tap is called by the first relay in response to receipt of an insurance claim for the first mission.

15. The system of claim 13, wherein the post-flight insurance tap is configured to determine validity of an insurance claim based on the UAV telemetry data.

16. The system of claim 13, wherein the post-flight insurance tap is configured to analyze the UAV telemetry data to determine whether the first mission resulted in violation of insurance policy conditions.

17. The system of claim 13, wherein the post-flight insurance tap is configured to generate an insurance payout value in response to analysis of the UAV telemetry data and insurance policy conditions in effect during the mission.

18. The system of claim 13, wherein the post-flight insurance tap is configured to:
package the UAV telemetry data and the sensor data; and
automatically submit the packaged data to an insurer or a representative of an insurer.

19. The system of claim 13, wherein the post-flight insurance tap adds the UAV telemetry data to a database to improve future risk prediction for missions.

20. The system of claim 19, wherein the post-flight insurance tap additionally adds the sensor data to the database.

* * * * *